(No Model.) 3 Sheets—Sheet 1.

N. W. PRATT.
FIRING VALVE FOR PNEUMATIC ORDNANCE.

No. 435,367. Patented Aug. 26, 1890.

WITNESSES.
H. F. Parker
D. R. Van Campen Jr.

INVENTOR.
Nat. W. Pratt
by Chas. W. Forbes
ATTORNEY.

THE NORRIS PETERS CO., PHOTO-LITHO., WASHINGTON, D. C.

(No Model.)  3 Sheets—Sheet 2.

N. W. PRATT.
FIRING VALVE FOR PNEUMATIC ORDNANCE.

No. 435,367. Patented Aug. 26, 1890.

WITNESSES,

INVENTOR.
Nat. W. Pratt
Chas. W. Forbes
ATTORNEY.

THE NORRIS PETERS CO., PHOTO-LITHO., WASHINGTON, D. C.

(No Model.)　　　　　　　　　　　　　　　　3 Sheets—Sheet 3.
N. W. PRATT.
FIRING VALVE FOR PNEUMATIC ORDNANCE.

No. 435,367.　　　　　　　　　　　Patented Aug. 26, 1890.

WITNESSES.　　　　　　　　　　　　　　　INVENTOR.
Nat. W. Pratt
by Chas. N. Forbes
ATTORNEY.

UNITED STATES PATENT OFFICE.

NAT. W. PRATT, OF BROOKLYN, NEW YORK.

FIRING-VALVE FOR PNEUMATIC ORDNANCE.

SPECIFICATION forming part of Letters Patent No. 435,367, dated August 26, 1890.

Application filed March 16, 1889. Serial No. 303,580. (No model.)

*To all whom it may concern:*

Be it known that I, NAT. W. PRATT, a citizen of the United States, residing at Brooklyn, county of Kings, and State of New York, have invented certain new and useful Improvements in Firing-Valves for Pneumatic Ordnance, of which the following is a specification.

This invention relates to automatically-operated firing-valves for delivering specified charges of compressed impelling-fluid from the reservoir to the gun-barrel of a pneumatic gun to perform the act of firing; and the invention more especially relates to the means for automatically controlling the said firing-valve movements, whereby the time of opening and delivery capacity of the latter is predetermined and made correspondingly automatic.

The invention consists of a novel construction of the automatic controlling-valve for exhausting and recharging the actuating-chamber of the firing-valve, of actuating devices pertaining thereto, and of a certain arrangement of port-connections between said controlling-valve and the firing-valve chambers, whereby the firing-valve is caused to respond to the automatic controlling-valve movements.

The invention also comprises an auxiliary cushioning-piston adapted to and forming a part of the firing-valve, whereby its stroke in either direction is relieved from concussion.

In order to enable others skilled in the art to which my invention appertains to understand and use the same, I will proceed to describe the details of its construction, explain its operation, and point out in the appended claims its novel characteristics.

Figure 1:
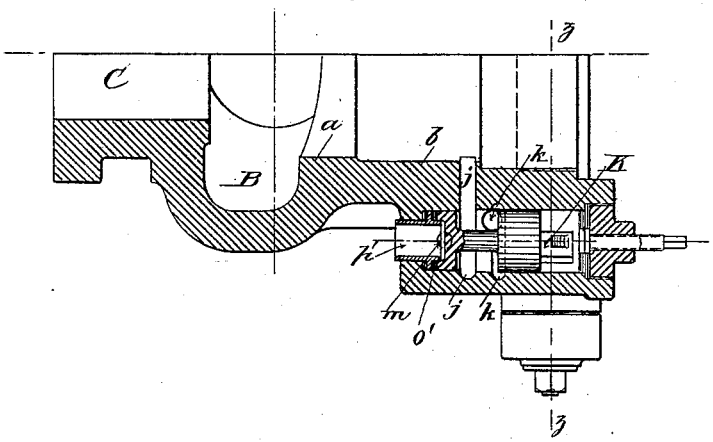
Figure 2:
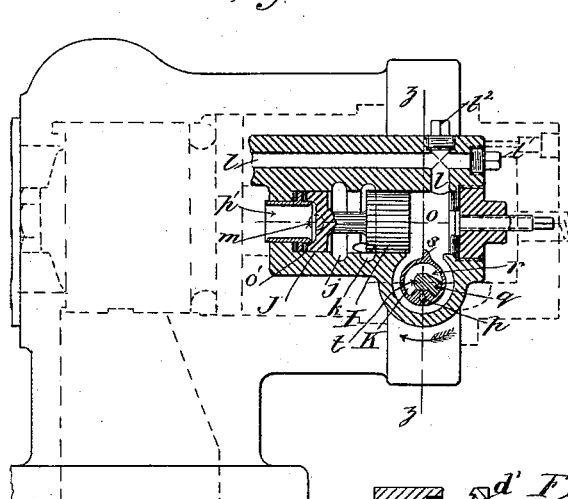
Figure 3:
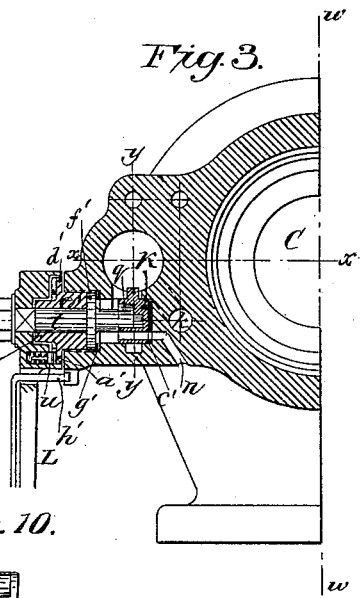
Figure 10:
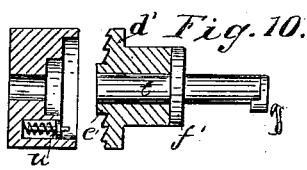
Figure 7:
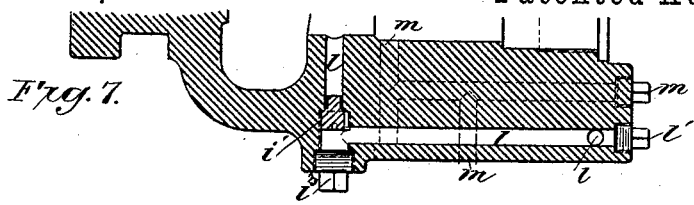
Figure 4:
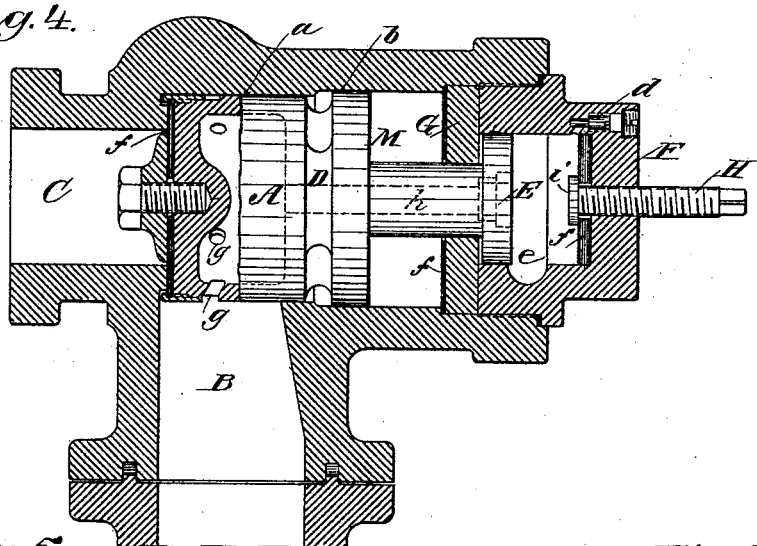
Figure 5:
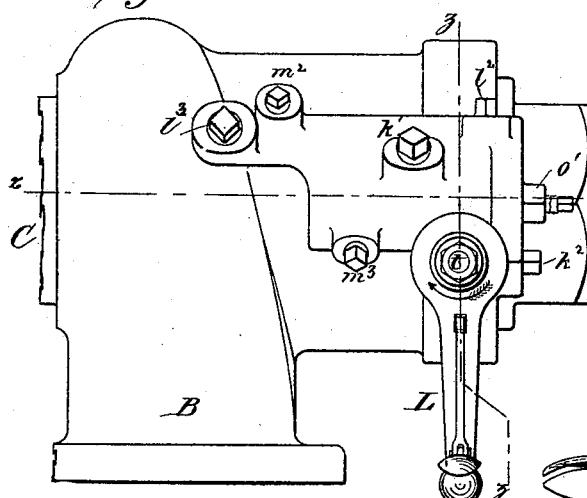
Figure 6:
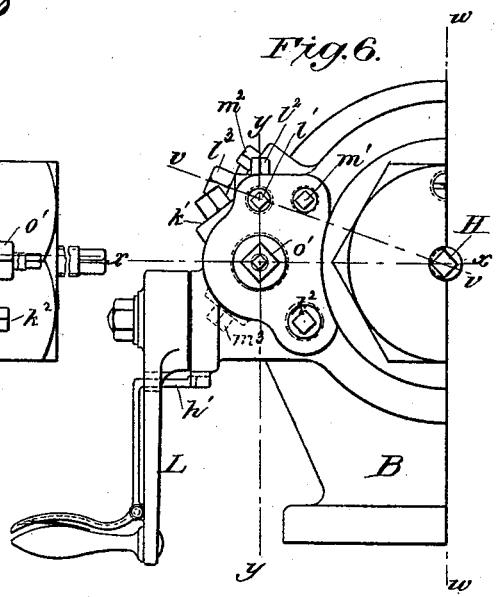
Figure 8:
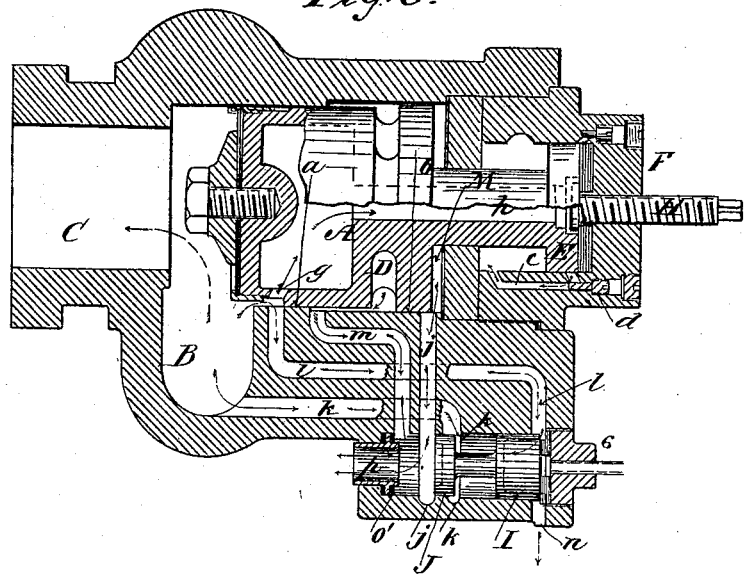
Figure 9:
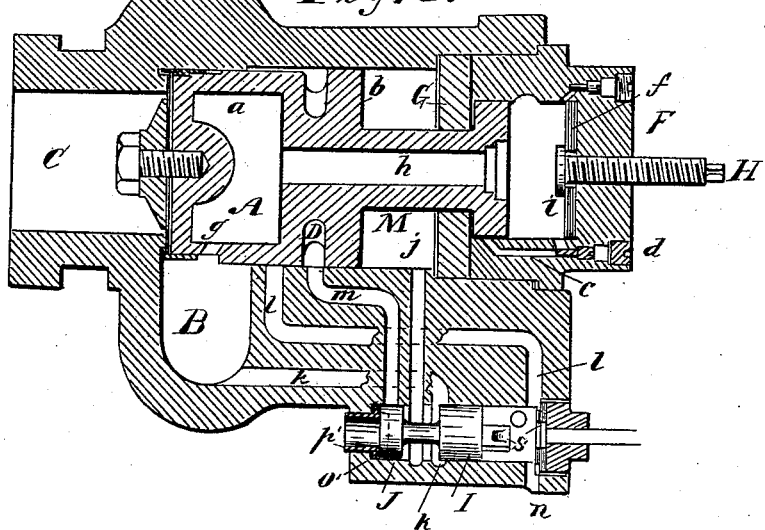

Referring to the accompanying drawings, forming a part of this specification, and in which like letters of reference indicate like parts throughout, Figure 1 is a horizontal section of the controlling-valve and a part of the firing-valve casing on the line $x\,x$, Figs. 3, 5, and 6; Fig. 2, a vertical section of the controlling-valve, (the firing-valve casing appearing in elevation,) taken on the line $y\,y$, Figs. 3 and 6; Fig. 3, a transverse section on the line $z$, Figs. 1, 2, and 5; Fig. 4, a vertical section of the firing-valve casing and firing-valve partly in section on the line $w\,w$, Figs. 3 and 6; Fig. 5, a side elevation, and Fig. 6 a partial rear end view, of the exterior; Fig. 7, a partial section on the radial plane $v\,v$, Fig. 6, the dotted port shown therein being diagrammatic of a port properly excluded by the said plane of section; Fig. 8, a diagrammatic assemblage of the port connections, the same being brought into a common plane of section for convenience of observation. Fig. 9 is a view similar to Fig. 8 with the main valve in closed position. Fig. 10 is a detail section of parts connected with the operating-handle detached.

A, Fig. 4, is a firing-valve having differential diameters at $a$ and $b$ of its plunger part fitting corresponding cylinder-bores and controlling communication between the induction-pipe B from the impelling-fluid reservoir and the eduction or gun-barrel pipe C. The intermediate space D between the said differential valve-diameters is permanently free from pressure, and the valve is actuated by application of pressures on its externally-exposed unequal areas.

E is the valve-cushioning piston, located in and fitting an independent cylinder, as shown, the casing whereof consists of the body F and substantially pressure-tight diaphragm G and is firmly secured to the firing-valve casing. The cylinder-body F is provided with a run-around port $c$, connecting from end to end of said cylinder, and adapted by means of a cramping-plug $d$ to offer a determinable resistance to the air-cushion transfer between the said respective cylinder ends. The mid portion of said cylinder is provided with an enlargement $e$, whereby the piston E is relieved of resistance during the intermediate transit of its stroke in either direction.

$f\,f\,f$ are layers of suitable cushioning material interposed at the surfaces where the valve abuts at either stroke termination to lessen the shock of impact, the said cushioning material at the seating portion of the valve serving also as pressure-tight packing.

The firing-valve is made hollow, and through orifices $g$ and a central hole $h$ the piston E is permanently supplied with pressure upon both sides from reservoir-pipe B.

H is a screw-threaded driver used for forcing the firing-valve to its seat when necessary preparatory to the gun action. The driver H, having a head $i$ within, is adapted to be pressure-tight against the packing $f$ when retracted.

Referring now to Figs. 1, 2, and 3, I and J are the larger and smaller pistons, respectively, of a differential double-piston-controlling valve controlling the firing-valve-actuating port $j$, (see also Figs. 8 and 9,) and actuated by pressure received through ports $k$ and $l$ for said controlling purpose, the port $m$ being incidentally controlled also for eduction at each stroke of any pressure that may accumulate in chamber D by leakage from chambers B or M.

The cup-shaped smaller piston J seats on suitable pressure-tight packing $o'$ around the exhaust-nipple $p'$ when the controlling-valve is in the position of Figs. 1, 2, and 9, at the same time permitting communication between the port $k$ and port $j$ to admit retaining pressure from chamber B to the actuating pressure-chamber M back of the firing-valve. At the opposite position (illustrated by Fig. 8) the piston J severs the said communication of port $k$ and port $j$ and exhausts the latter and actuating-chamber M through nipple $p'$, however, permitting pressure from port $k$ to continue between the valve-pistons I J, retaining them at said position by reason of their differential diameters until overcome by pressure in chamber $o$ from chamber B through port $l$ after the firing-valve A has opened and uncovered the latter, as shown in Fig. 8. It will be observed that by its construction the exhaust-valve J seats tight on the packing $o'$ in its normal position, but continues substantially tight at its piston part relative to the port $j$ during the early portion of its stroke, whereby should the application of opening pressure start it out slightly from its seat prior to release by the firing mechanism the gun will not be prematurely fired.

The port $l$ is provided with a cramping plug or valve $i'$, (shown in Fig. 7,) screw-threaded in place, accessible through plug $l^3$, and thereby adjustable to retard the flow through port $l$ more or less, as required to time the closing of the firing-valve.

The relief-port $n$, Fig. 8, is controlled by a means not shown in said figure, but shown by Figs. 1, 2, 3, 5, and 6, of which K is the hand-opened but automatically-closing relief-valve whereby the act of firing is produced. The valve K opens the relief-port $n$ to the atmosphere and relieves pressure in chamber $o$ and port $l$ when turned with its opening $p$ coincident with said port $n$.

The relief-valve K consists of a circular revolving disk seated at its inner flat surface $c'$, and is capable of complete revolution, the greater part whereof is produced by means of the external hand-crank L, Figs. 5 and 6, and the remainder by engagement of its tappet $s$ with the margin of the controlling-valve piston I. To this purpose the said valve K is provided with a recess $r$, in which the toe $q$ of the hand crank-shaft $t$ engages to turn the same in the direction of the arrow up to the opening point shown, Figs. 2 and 3, of the passage $p$, at which the tappet $s$ is in position to be further driven automatically by piston I upon movement of the latter, carrying the valve K to its closed position.

The crank L is provided with a spring-pawl $u$, engaging with the ratchet $a'$ on the stationary disk $d'$ for the purpose of insuring the proper direction of rotation of the said crank. This is a common form of clutch engagement, permitting independent motion of the parts in one direction, but not in the other. The bushing $e'$, bearing the disk $d'$, is screwed in place in the valve-casing and retains the collar $f'$ of the shaft $t$ pressure-tight against the packing $g'$. The crank L is locked at the firing position by engagement of the grip-latch $h'$.

The various port-plugs shown in several of the figures are employed for convenience of construction, and therefore do not require specific explanation here. The same, however, designate the actual location of the various ports to which they belong, and are identified herein by corresponding numerated letters. It is of course to be understood that the reservoir passage or pipe B is intercepted by a stop-valve of usual construction to be kept constantly open or closed in time of action or inaction.

The operation is as follows: The reservoir-pipe B being charged with pressure, the valve A is seated, the controlling-valve I J being also seated, Figs. 1 and 2, to permit admission of retaining-pressure to chamber M. The relief-valve K being advanced to its closed position, the gun is ready for action. The act of firing is effected by the complete rotation of crank L from the position shown to a repetition of said position, with the relief-valve opening $p$ coincident with relief-port $n$, and whereby the consequent automatic opening and closing movements of the controlling-valve I J and responsive movements of the firing-valve A are caused to occur in the following order: first, the exhaustion of chamber $o$ (the port $l$ being cut off by the firing-valve) and consequent opening stroke of the controlling-valve I J and the simultaneous exhaustion of chamber M through port $m$ and nipple $p'$ and cessation of relief-valve discharge through port $n$ by the tappet movement, this effecting a wide-open motion of the firing-valve; second, the wide-open dwell of the latter delivering the impelling-fluid while simultaneously recharging chamber $o$ through port $l$, the rate of said recharging being predetermined by the cramping-valve $i'$, and, third, the return of the controlling-valve I J to its first position, permitting the recharge of the actuating pressure-chamber M through ports $k$ and $j$ and the return thereby of the firing-valve to its seat. By this operation I obtain corresponding results to those which I have described as pertaining to the firing-valve in an application for a patent filed March 19, 1887, Serial No. 231,601—namely, three separate movements: first, an instantaneous wide-open motion of said firing-valve; second, a variable dwell in this position, and third, an instant closure, the period of said variable dwell being automatic and eliminating the personal equation of the gunner; but the distinctive feature herein lies mainly in terminating the period of exhaust of the controlling-valve by recharging the pressure side of its actuating-piston through a regulated port in lieu of exteriorly exhausting the opposite side of said piston through a regulated escape-valve to the atmosphere and the substitution of the herein-described relief-valve trip for the latch mechanism performing a corresponding function in the aforesaid application.

The herein-described exhaust-piston valve J, however actuated, is applicable to any pneumatic gun-firing valve which is held normally closed as against the firing-fluid by the application of said fluid to the back of said valve on a predominating area of the latter in a separate chamber and rendered active by the reduction of pressure in said separate chamber. Therefore,

What I claim as my invention herein, and desire to secure by Letters Patent, is—

1. In a gun-firing valve, the combination of the main firing-piston having pressure areas of different size, the cylinder having chambers corresponding with the piston, a cushioning-piston attached to the main valve-piston and working in a cylinder, and a run-around passage in said cushioning-cylinder controlled by a clamping-plug, substantially as described.

2. The combination, with the main valve-piston, of a cushioning-piston connected thereto, chambers in which said pistons work, a run-around passage in the cushioning-piston chamber, and cushions at the end of the cushion-chamber, all substantially as described.

3. In a gun-firing valve, the combination of a cylinder with chambers of different diameter, the main valve-piston having pressure-surfaces of different area and having a cushioning-piston attached, and a passage through said piston, said passage having an opening $g$ into the supply-passage which is closed by the valve in its opening movement, substantially as described.

4. The main piston, a piston controlling the same, suitable chambers in which these pistons work, an exhaust-valve governing the escape from the controlling-valve, and a handle engaging said exhaust-valve to move a part of its stroke, said exhaust being actuated for the remainder of its stroke by the controlling-valve, all combined substantially as described.

NAT. W. PRATT.

Witnesses:
CHAS. W. FORBES,
JOHN A. ELLIS.